United States Patent
Zhang et al.

(10) Patent No.: US 7,988,896 B2
(45) Date of Patent: Aug. 2, 2011

(54) METHOD OF PREPARING CARBON NANOTUBE/POLYMER COMPOSITE MATERIAL

(75) Inventors: Qiu-Cen Zhang, Beijing (CN);
Peng-Cheng Song, Beijing (CN);
Chang-Hong Liu, Beijing (CN);
Shou-Shan Fan, Beijing (CN)

(73) Assignees: Tsinghua University, Beijing (CN);
Hon Hai Precision Industry Co., Ltd., Tu-Cheng, New Taipei (TW)

( * ) Notice: Subject to any disclaimer, the term of this patent is extended or adjusted under 35 U.S.C. 154(b) by 463 days.

(21) Appl. No.: 11/831,907

(22) Filed: Jul. 31, 2007

(65) Prior Publication Data
US 2008/0145570 A1   Jun. 19, 2008

(30) Foreign Application Priority Data
Aug. 9, 2006   (CN) .......................... 2006 1 0062034

(51) Int. Cl.
*B29C 39/12* (2006.01)
(52) U.S. Cl. ........ 264/259; 264/308; 264/263; 264/261; 264/275; 264/128
(58) Field of Classification Search ........................ None
See application file for complete search history.

(56) References Cited

U.S. PATENT DOCUMENTS

| | | | | |
|---|---|---|---|---|
| 2,793,970 | A * | 5/1957 | Jeppson ................... | 156/191 |
| 3,413,391 | A * | 11/1968 | Carroll et al. .............. | 264/102 |
| 6,924,335 | B2 * | 8/2005 | Fan et al. .................. | 524/495 |
| 7,056,455 | B2 * | 6/2006 | Matyjaszewski et al. ... | 264/29.2 |
| 7,396,477 | B2 * | 7/2008 | Hsiao ........................ | 216/2 |
| 7,569,425 | B2 | 8/2009 | Huang et al. | |
| 7,695,769 | B2 | 4/2010 | Watanabe et al. | |
| 2003/0108704 | A1 | 6/2003 | Yano et al. | |
| 2003/0122111 | A1 | 7/2003 | Glatkowski | |
| 2003/0203139 | A1 * | 10/2003 | Ren et al. ................. | 428/34.3 |
| 2004/0071949 | A1 | 4/2004 | Glatkowski et al. | |
| 2004/0097635 | A1 * | 5/2004 | Fan et al. .................. | 524/496 |
| 2005/0061451 | A1 * | 3/2005 | Busnaina et al. .......... | 156/598 |
| 2005/0131147 | A1 | 6/2005 | Brule | |
| 2005/0170169 | A1 * | 8/2005 | Watanabe et al. .......... | 428/323 |

(Continued)

FOREIGN PATENT DOCUMENTS

JP   2001-30200   2/2001

(Continued)

OTHER PUBLICATIONS

Ping Hu, Research of the carbon nanotube/UHMWPE material, Engineering Plastics Application, 1998,1-2pages, vol. 26(1), China Academic Journal Electronic Publishing House, China.

*Primary Examiner* — Edmund H. Lee
(74) *Attorney, Agent, or Firm* — Jeffrey T. Knapp

(57) ABSTRACT

A method of preparing a carbon nanotube/polymer composite material is provided. The method includes (a) providing a carbon nanotube-based film and a pre-polymer solution; (b) placing the carbon nanotube-based film at a bottom of a container, and pouring the pre-polymer solution in the container; and (c) polymerizing the pre-polymer solution and simultaneously integrating the pre-polymer solution with the carbon nanotube-based film. As such, a carbon nanotube/polymer composite material, including the polymer-impregnated nanotube layer and an upper polymer layer, is obtained. A multi-layer composite can be produced by essentially repeating this process, using the upper polymer layer as the base layer for the formation of the next layer set thereon.

20 Claims, 9 Drawing Sheets

U.S. PATENT DOCUMENTS

| | | | |
|---|---|---|---|
| 2006/0166003 A1* | 7/2006 | Khabashesku et al. | 428/413 |
| 2006/0275956 A1* | 12/2006 | Konesky | 438/128 |
| 2007/0004081 A1* | 1/2007 | Hsiao | 438/106 |
| 2007/0138010 A1* | 6/2007 | Ajayan | 204/400 |
| 2008/0145570 A1 | 6/2008 | Zhang et al. | |
| 2008/0290020 A1* | 11/2008 | Marand et al. | 210/500.27 |
| 2009/0014691 A1 | 1/2009 | Kint et al. | |
| 2009/0053515 A1* | 2/2009 | Luo et al. | 428/339 |
| 2010/0104849 A1* | 4/2010 | Lashmore et al. | 428/305.5 |

FOREIGN PATENT DOCUMENTS

| | | |
|---|---|---|
| JP | 2001-261716 | 9/2001 |
| JP | 2002-67209 | 3/2002 |
| JP | 2003-201405 | 7/2003 |
| JP | 2003-238822 | 8/2003 |
| JP | 2004-179564 | 6/2004 |
| JP | 2004-315253 | 11/2004 |
| JP | 2004-348121 | 12/2004 |
| JP | 2005-14201 | 1/2005 |
| JP | 2005-97435 | 4/2005 |
| JP | 2005-133062 | 5/2005 |
| JP | 2005-238708 | 9/2005 |
| JP | 2005-255985 | 9/2005 |
| JP | 2005-336341 | 12/2005 |
| JP | 2006-69165 | 3/2006 |
| JP | 2006-147801 | 6/2006 |
| JP | 2006-184767 | 7/2006 |
| JP | 2006-527786 | 12/2006 |
| JP | 2008-45124 | 2/2008 |
| JP | 2008-520404 | 6/2008 |
| TW | 200533736 | 10/2005 |

* cited by examiner

METHOD OF PREPARING CARBON NANOTUBE/POLYMER COMPOSITE MATERIAL

RELATED APPLICATIONS

This application is related to commonly-assigned, co-pending application: entitled, "CARBON NANOTUBE COMPOSITE", filed Jul. 31, 2007 Ser. No. 11/831,904. The disclosure of the above-identified application is incorporated herein by reference.

BACKGROUND

1. Technical Field

The present invention relates to a method of preparing a carbon-nanotube based composite material and, more particularly, to a method of preparing a carbon nanotube/polymer composite material.

2. Description of Related Art

Since the report of their discovery in 1991 by Iijima, carbon nanotubes (CNTs) have been extensively studied for their interesting structural, physio-chemical, mechanical, electrical, and electromechanical properties. Many potential technological applications have been proposed including hydrogen storage, nanoelectronic devices, field emission display (FED), field emission microscopy (FEM), chemical sensors, and so on. Carbon nanotubes are considered desirable, at least in part, due to their unique electrical and mechanical properties. Currently, the study of carbon nanotube/polymer composite materials is gaining significant attention. Such a nanotube-reinforced composite material has board applications because of good antistatic performance, microwave absorbing capability, electromagnetic shielding ability, and so on.

Generally speaking, a carbon nanotube/polymer composite material has been prepared via an in-situ polymerization process, solution compounding process, and/or a melt compounding process.

However, a carbon nanotube/polymer composite material prepared by the above-mentioned processes tend to have a relatively higher resistance value. Furthermore, relatively poor conductivity network is formed among carbon nanotubes. Such high resistance and poor conductivity is essentially a product of a lack of connectivity between a significant number of proximate carbon nanotubes. Therefore, the good electrical conductivity and thermal conductivity properties of carbon nanotubes has heretofore not, on the whole, been sufficiently utilized in nanotube-based composites.

What is needed, therefore, is a method of preparing a carbon nanotube/polymer composite material, in which carbon nanotubes have desirable interconnection.

SUMMARY

In one present embodiment, a method of preparing a carbon nanotube/polymer composite material includes the steps of:
(a) providing a carbon nanotube-based film and a pre-polymer solution;
(b) placing the carbon nanotube-based film at a bottom of a container, and pouring the pre-polymer solution in the container; and
(c) polymerizing the pre-polymer solution and simultaneously integrating the pre-polymer solution with the carbon nanotube-based film, thereby obtaining a carbon nanotube/polymer composite material.

In another present embodiment, a method of preparing a multilayer carbon nanotube/polymer composite material includes the steps of:
(a') providing a first carbon nanotube-based film and a pre-polymer solution;
(b') placing the first carbon nanotube-based film at a bottom of a container, and pouring the pre-polymer solution in the container;
(c') polymerizing the pre-polymer solution and simultaneously integrating the pre-polymer solution with the first carbon nanotube-based film, thereby obtaining a first layer of a carbon nanotube/polymer composite film, the first layer of the carbon nanotube/polymer composite film acting as an upper exposed layer of the carbon nanotube/polymer composite film;
(d') disposing an additional carbon nanotube-based film on the upper exposed layer of the carbon nanotube/polymer composite film, pouring the pre-polymer solution in the container, causing the pre-polymer solution to polymerize and to become integrated with the additional carbon nanotube-based film, thereby forming an additional layer of carbon nanotube/polymer composite film, the additional layer of carbon nanotube/polymer composite film now serving as the upper, currently-exposed layer of the carbon nanotube/polymer composite film; and
(e') repeating the step (d') to thereby prepare a multilayer carbon nanotube/polymer composite, using the upper exposed polymer layer as the base layer for the formation of the next layer set (i.e., the polymer-impregnated nanotube layer and the upper polymer layer) thereon.

BRIEF DESCRIPTION OF THE DRAWINGS

Many aspects of the present method can be better understood with reference to the following drawings. The components in the drawings are not necessarily to scale, the emphasis instead being placed upon clearly illustrating the principles of the present method.

Figure 1:
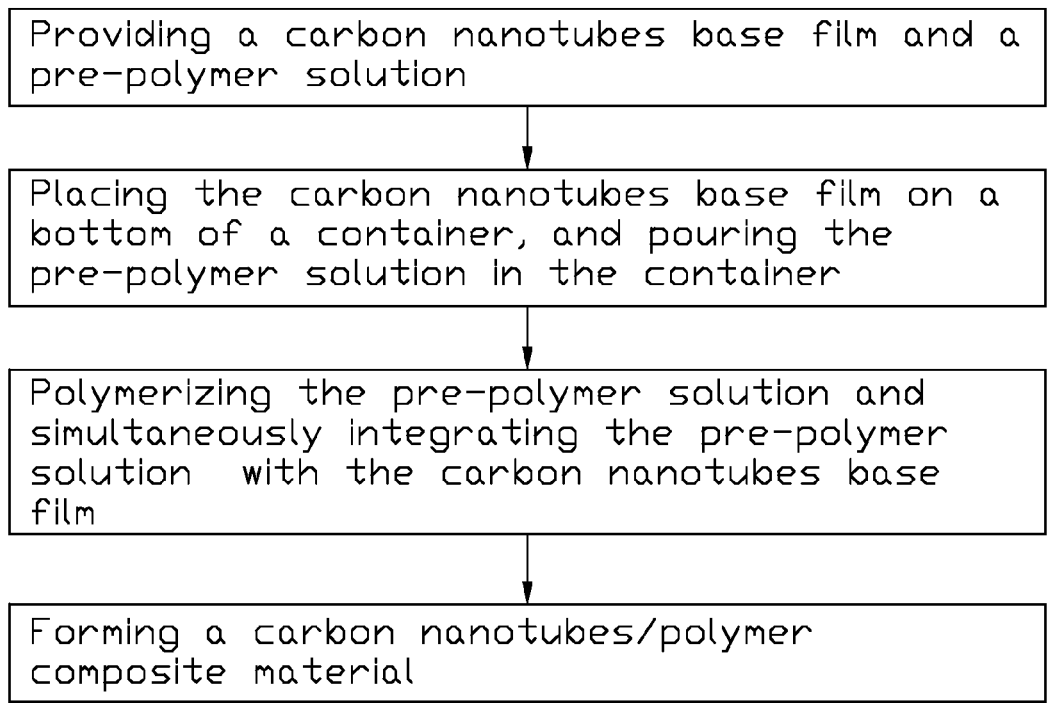
FIG. 1 is a flow chart of a method of preparing carbon nanotube/polymer composite material, according to a first present embodiment.

Corresponding reference characters indicate corresponding parts throughout the several views. The exemplifications set out herein illustrate at least one preferred embodiment of the present method, in one form, and such exemplifications are not to be construed as limiting the scope of the embodiment in any manner.

DETAILED DESCRIPTION OF THE EMBODIMENTS

Embodiments will now be described in detail below and with reference to the drawings. Referring to FIG. 1, a method of preparing a carbon nanotube/polymer composite material, according to a present embodiment, includes the following steps of: (a) providing a carbon nanotube-based film and a pre-polymer solution; (b) placing the carbon nanotube-based film at a bottom of a container, and pouring the pre-polymer solution in the container; (c) polymerizing the pre-polymer solution and simultaneously integrating the pre-polymer solution with the carbon nanotube-based film, thereby obtaining a carbon nanotube/polymer composite material. The method of preparing the above-described carbon nanotube/polymer composite material is described in detail, as follows.

In step (a), the carbon nanotube-based film may be produced, e.g., by a volatilization method or a chemical vapor deposition (CVD) method. The volatilization method includes the following steps of: firstly, mixing carbon nanotubes and dimethyl formamide solution together; secondly, dispersing the carbon nanotubes into the dimethyl formamide solution by an ultrasonic vibration dispersion method, thereby obtaining a mixture; and finally volatilizing the dimethyl formamide from the mixture, thereby obtaining the carbon nanotube-based film.

The pre-polymer solution may, for example, be a polymethyl methacrylate (PMMA) solution. A method of preparing the polymethyl methacrylate (PMMA) solution includes the following steps. Firstly, a pre-polymer such as 93~99.98 wt % of methyl methacrylate (MMA), a reaction initiator such as 0.02~2 wt % of azodiisobutyronitrile (AIBN), and a polymerization assistant, such as 0~5 wt % of dibutyl phthalate (DBP), are mixed together. Secondly, the admixture is pre-polymerized in a water bath of 80° C.~95° C. and stirred/churned for 5~30 minutes. The admixture is heated until the admixture looks like glycerin. Finally, the admixture is naturally cooled in ambient air until the pre-polymerization reaction has stopped.

In the present embodiment, the pre-polymer may, beneficially, be selected from the group consisting of ethyl acrylate, butyl acrylate, styrene, butadiene, acrylonitrile, and combinations thereof. The reaction initiator may be selected from the group consisting of benzoperoxide, azodiisobutyronitrile, and combinations thereof. The polymerization assistant may be selected from the group consisting of dibutyl phthalate, cetyl trimethyl ammoniumbromide, polyethylene acid salt, polymethacrylic acid salt, $C_{12}$-$C_{18}$ high fatty acid, silane coupling agent, titanate coupling agent, aluminate coupling agent, and combinations thereof.

In step (b), after the pre-polymer solution is poured in the container, the container is advantageously able to stand for 0.5~2 hours so that the pre-polymer solution can adequately settle and fill in interspaces of the carbon nanotube-based film to thereby form a mixed layer of the carbon nanotube-based film and pre-polymer solution at the bottom portion of the container.

In step (c), a carbon nanotube/polymer composite film with a single-side electrical conductivity (i.e., one side of the composite film remains covered by a layer of polymerized solution, which acts as an insulating layer) is able to be produced in the present embodiment.

The carbon nanotube-based film begins to be integrated with the pre-polymer solution at the interface therebetween. After the pre-polymer solution is polymerized, the produced polymer is tightly integrated with the carbon nanotubes of the carbon nanotube-based film, thereby forming the carbon nanotube/polymer composite material.

The processes of polymerization and integration are described in detail, as follows. Firstly, the container that contains the pre-polymer solution and the carbon nanotube-based film therein is held at a temperature of 50° C.~60° C. for 1~4 hours to urge the pre-polymer solution to polymerize and to simultaneously integrate with the carbon nanotube-based film. The container is further heated to 90° C.~100° C. for approximate 2 hours, so that the pre-polymer solution continues to polymerize and integrate with the carbon nanotube-based film, thereby forming the carbon nanotube/polymer composite film with single-side electrical conductivity. Carbon nanotube/polymer composite film of different thicknesses, e.g., in the range of 0.02~2 millimeters, can be produced by controlling the addition of the pre-polymer solution and/or the thickness of the initial carbon nanotube-based film.

In addition, one or more additional layers can be formed on the composite. To do so, an additional (e.g., in this case, second) layer of the carbon nanotube-based film is disposed on the exposed/upper (e.g., in this case, the first) carbon nanotube/polymer composite film, and then a definite amount/volume of the pre-polymer solution is poured in the container. After a while, using a treatment process like that used for the first layer, the pre-polymer solution is polymerized and integrated with the additional (e.g., second) carbon nanotube-based film, thereby forming the next additional (e.g., second) layer of the carbon nanotube/polymer composite film. By analogy, a multilayer carbon nanotube/polymer composite film of a desired number of composite layers can be easily prepared.

One particular embodiment provides a first method of preparing a carbon nanotube/PMMA composite film with single-side electrical conductivity. The first method includes the following steps.

(1). Providing a carbon nanotube-based film and a pre-polymer PMMA solution.

The carbon nanotube-based film may be produced by the volatilization method. The volatilization method includes the following steps of: 2~4 mg carbon nanotubes and 20 ml dimethyl formamide solution are firstly mixed together. Secondly, the carbon nanotubes are further dispersed into dimethyl formamide solution by 20~100 Hz ultrasonic vibration for about 0.5~4 hours (2 hours is quite suitable), thereby obtaining a mixture with carbon nanotubes uniformly dispersed therein. The carbon nanotubes may be single-walled carbon nanotubes (SWCNTs) or multi-walled carbon nanotubes (MWCNTs). The dimethyl formamide solution has shown to be a good dispersant for the carbon nanotubes. A saturation point of the carbon nanotubes in the dimethyl formamide solution is about 0.25 mg/ml. Finally, the mixture is poured in a container, and the container is then disposed in a drying box. The mixture is dried in ambient air at a temperature of 100° C. for about 2 hours until the dimethyl formamide is completely volatilized from the mixture. The carbon nanotube-based film is thus prepared at the bottom of the container.

A method of preparing the polymethyl methacrylate (PMMA) solution includes the following steps. Firstly, the polymer, such as 97 wt % of methyl methacrylate (MMA); the reaction initiator, such as 0.1 wt % of azodiisobutyronitrile (AIBN); and the polymerization assistant, such as 2.9 wt % of dibutyl phthalate (DBP), are mixed together. Secondly, the mixture is pre-polymerized in a water bath of 92° C. while being stirred for 10 minutes. The heating occurs until the mixture looks like glycerin. Finally, the mixture is naturally cooled in an air atmosphere until pre-polymerization reaction has stopped.

(2). The carbon nanotube-based film is placed at a bottom portion of a container, and then the pre-polymer solution is poured in the container.

After the pre-polymer solution is poured in the container, the container is beneficially able to stand for 0.5~2 hours so that the pre-polymer solution can adequately settle and fill in interspaces of the carbon nanotube-based film to thereby form a mixed layer of the carbon nanotube-based film and pre-polymer solution at the bottom portion of the container.

(3). The pre-polymer solution is polymerized, and the pre-polymer solution simultaneously integrates with the carbon nanotube-based film, thereby forming a carbon nanotube/polymer composite material. A carbon nanotube/polymer composite film with single-side electrical conductivity may be produced in the first embodiment.

The processes of polymerization and integration are described in detail as follows. Firstly, the container that has the pre-polymer solution and the carbon nanotube-based film therein, is held at a temperature of 50° C.~60° C. for 1~4 hours to urge the pre-polymer solution to polymerize, and to simultaneously integrate with the carbon nanotube-based film. The container is further heated to 90° C.~100° C. for approximate 2 hours, so that the pre-polymer solution continues to polymerize and integrate with the carbon nanotube-based film, thereby forming the carbon nanotube/PMMA composite film with single-side electrical conductivity.

Figure 2:
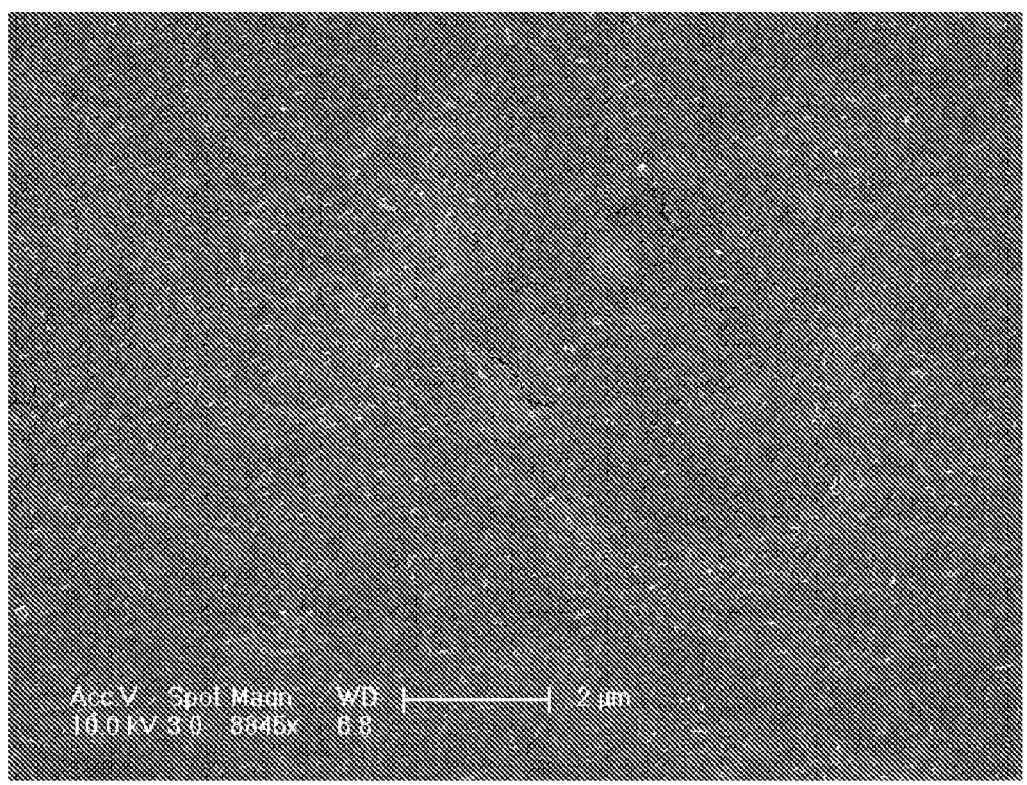
FIG. 2 is a SEM (Scanning Electron Microscope) image of a front/top surface of a carbon nanotubes/PMMA composite film with single-side electrical conductivity, according to the first present embodiment.
Figure 3:
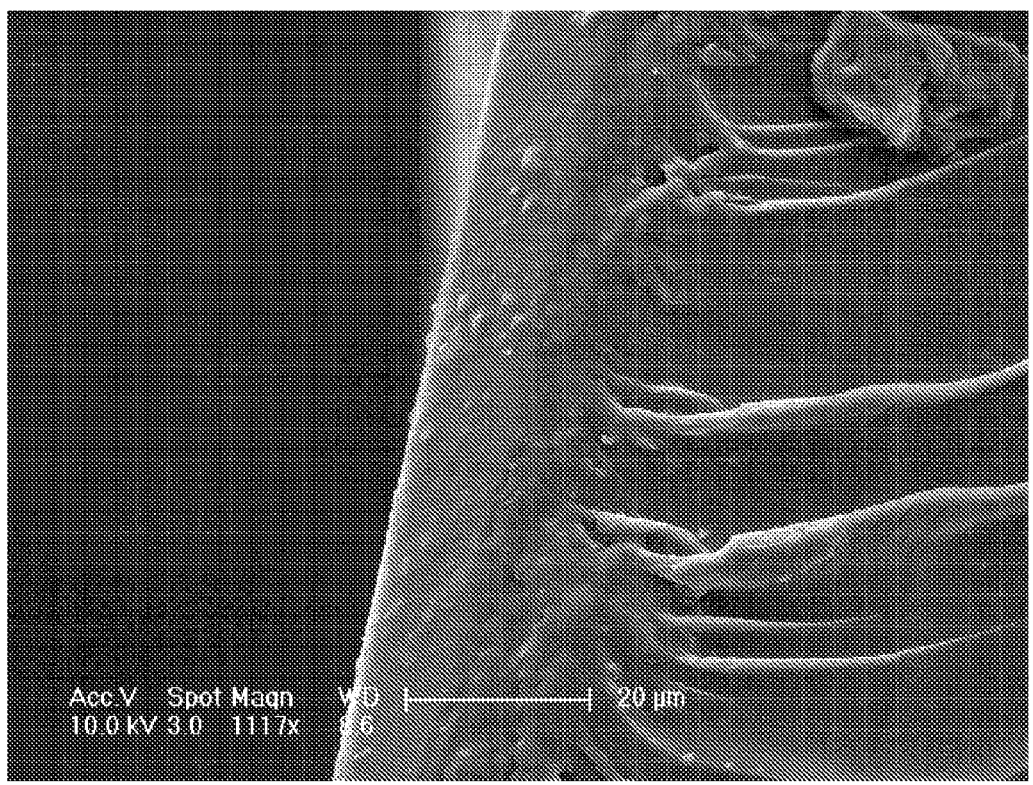
FIG. 3 is a SEM image of a side surface of a carbon nanotubes/PMMA composite film with single-side electrical conductivity, according to the first present embodiment.

Referring to FIG. 2, a SEM (Scanning Electron Microscope) image of a front/top surface of the carbon nanotube/PMMA composite film with single-side electrical conductivity, according to the first present embodiment, is shown. Many carbon nanotubes are obviously seen from FIG. 2. A SEM image of a side surface of the carbon nanotube/PMMA composite film with single-side electrical conductivity, according to the first present embodiment, is shown in FIG. 3. A thickness of the layer of carbon nanotubes is about 10 microns.

Figure 4:
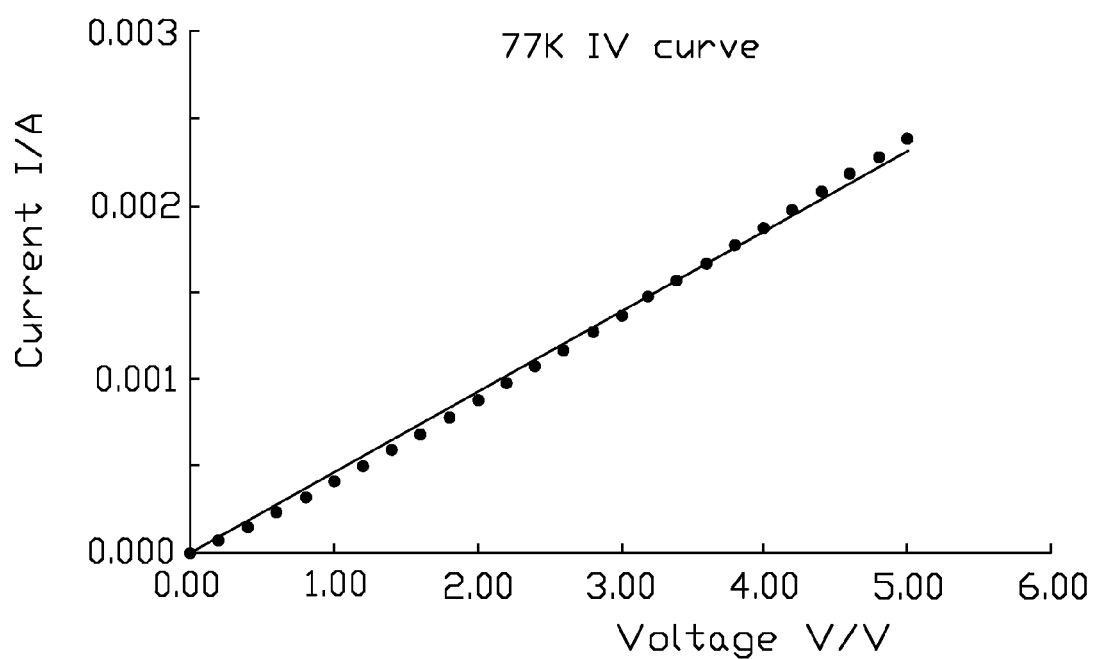
FIG. 4 is a current-voltage graph of a carbon nanotubes/PMMA composite film with single-side electrical conductivity, according to the first present embodiment, at a low temperature of 77K.
Figure 5:
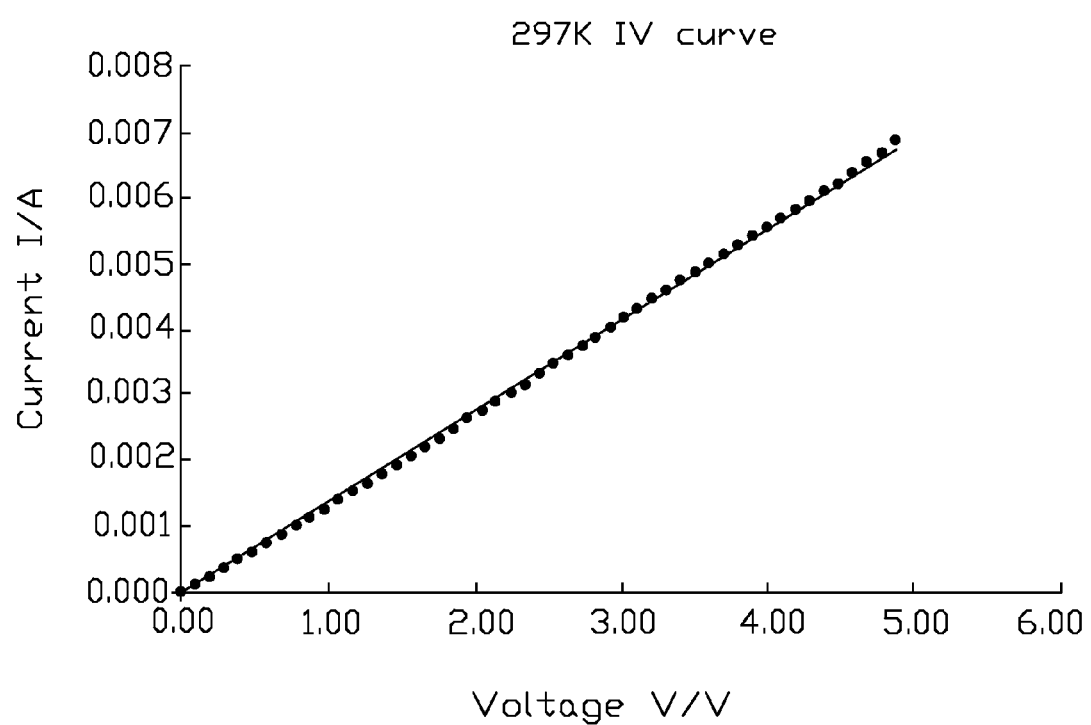
FIG. 5 is a current-voltage graph of a carbon nanotubes/PMMA composite film with single-side electrical conductivity, according to the first present embodiment, at a room temperature of 297K.
Figure 6:
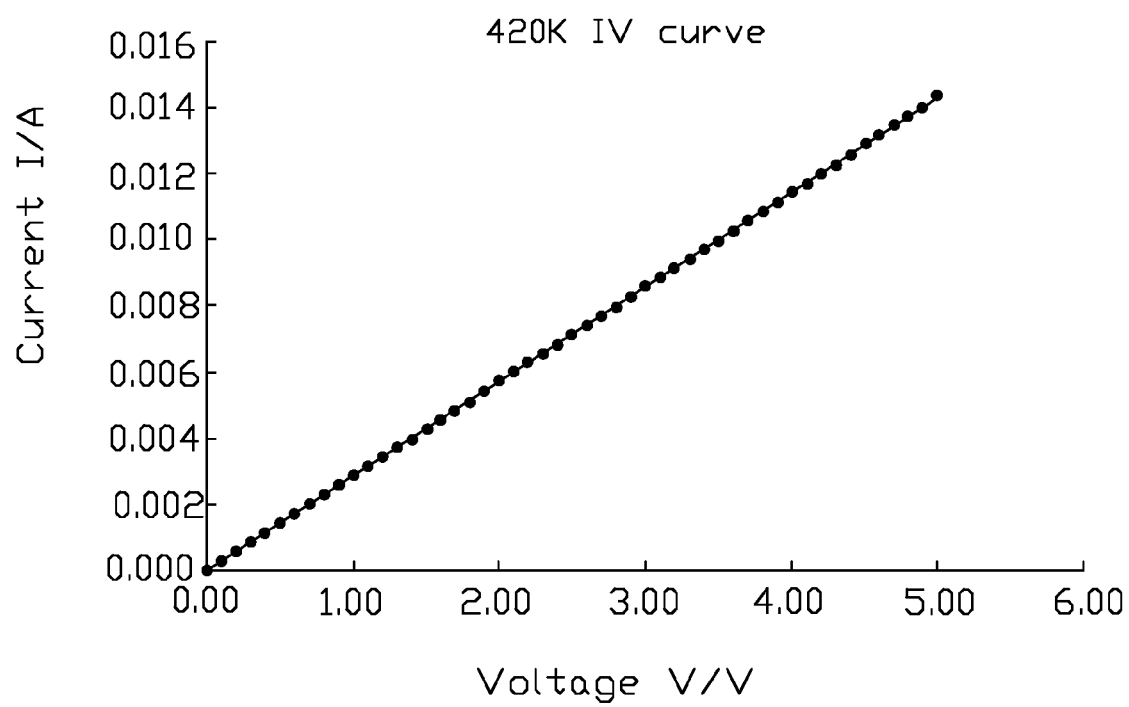
FIG. 6 is a current-voltage graph of a carbon nanotubes/PMMA composite film with single-side electrical conductivity, according to the first present embodiment, at a high temperature of 420K.

Referring to FIG. 4, a current-voltage graph of the carbon nanotube/PMMA composite film with single-side electrical conductivity at a low temperature of 77K, according to the first present embodiment, is shown. FIG. 5 shows a current-voltage graph of the carbon nanotube/PMMA composite film with single-side electrical conductivity at a room temperature of 297K, according to the first present embodiment. FIG. 6 shows a current-voltage graph of the carbon nanotube/PMMA composite film with single-side electrical conductivity at a high temperature of 420K, according to the first present embodiment. It can be seen from FIGS. 4, 5, and 6 that the resistance value of the carbon nanotubes/PMMA composite film is very low, and the performance of the carbon nanotubes/PMMA composite film is comparatively stable, over a range of temperatures.

A second particular embodiment provides a method of preparing a carbon nanotubes array/PMMA composite film with single-side electrical conductivity. The method includes the following steps.

(1). Providing a carbon nanotubes array and a pre-polymer PMMA solution.

The carbon nanotubes array may be produced by the chemical vapor deposition (CVD) method. The chemical vapor deposition (CVD) method includes the following steps. A substrate is first provided. Secondly, a layer of catalyzer, selected from the group consisting of Fe, Co, Ni, or an alloy thereof, is deposited on the substrate. The substrate with the layer of catalyzer deposited, is heat-treated at 300° C.~500° C. for 0.2~12 hours in an air atmosphere. The layer of catalyzer changes into oxidized particles after such annealing. Then, the substrate is disposed in a reaction apparatus with a protection gas and heated to a predetermined temperature in the approximate range of 400° C.~750° C. Protection gas may be any inert gas, nitrogen gas, or combination thereof. Preferably, the protection gas is argon gas. Finally, a mixed gas containing protection gas and carbon source is introduced in the reaction apparatus. When the reaction apparatus is heated to 400° C.~750° C., a carbon nanotube array is produced therein. The carbon source may be a hydrocarbon such as ethyne or ethane. Preferably, the carbon source is ethyne.

A method of preparing a polymethyl methacrylate (PMMA) solution includes the following steps. Firstly, a pre-polymer such as 95 wt % of methyl methacrylate (MMA), a reaction initiator such as 1 wt % of azodiisobutyronitrile (AIBN), and a polymerization assistant such as 4 wt % of dibutyl phthalate (DBP), are mixed together. Secondly, the admixture is pre-polymerized in a water bath of 95° C. and stirred/churned for 10 minutes. The admixture is heated until the admixture looks like glycerin. Finally, the admixture is naturally cooled in air atmosphere until the pre-polymerization reaction has stopped.

(2). The carbon nanotube array is placed at a bottom portion of a container, and then the pre-polymer solution is poured in the container.

After the pre-polymer solution is poured in the container, the container is advantageously able to stand for 0.5~2 hours so that the pre-polymer solution can adequately settle and fill in interspaces of the carbon nanotube array to thereby form a mixed layer of the carbon nanotube array and pre-polymer solution at the bottom portion of the container.

(3). The pre-polymer solution is polymerized, and the pre-polymer solution is simultaneously integrated with the carbon nanotube array, thereby obtaining a carbon nanotube array/polymer composite material.

The processes of polymerization and integration are described in detail as follows. Firstly, the container that contains the pre-polymer solution and the carbon nanotube array therein, is held at a temperature of 50° C.~60° C. for 2.5 hours to urge the pre-polymer solution to polymerize, and to simultaneously integrate with the carbon nanotube array. The container is further heated to 90° C.~100° C. for approximate 2 hours, so that the pre-polymer solution continues to polymerize and integrate with the carbon nanotube array, thereby forming the carbon nanotube array/PMMA composite film with single-side electrical conductivity.

Figure 7:
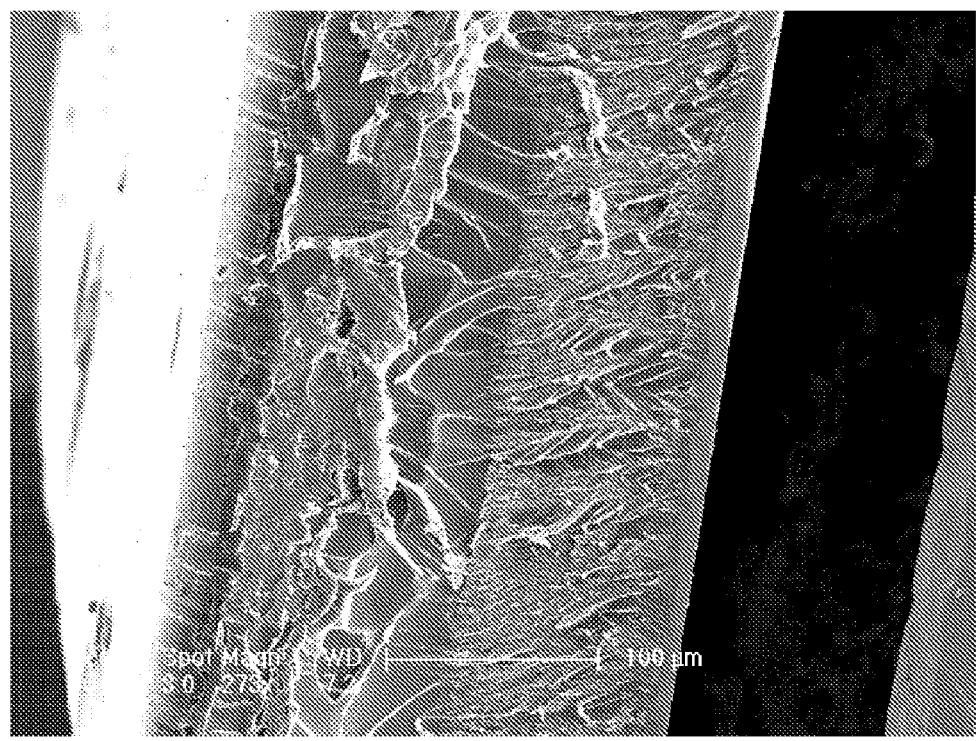
FIG. 7 is a SEM image of a side of a carbon nanotubes array/PMMA composite film with single-side electrical conductivity, according to a second present embodiment.

Referring to FIG. 7, a SEM image of a side surface of the carbon nanotubes array/PMMA composite film with single-side electrical conductivity, according to the second present embodiment, is shown. A thickness of the layer of the carbon nanotubes array is about 100 microns and is separate from a layer of PMMA formed directly thereon.

A third embodiment provides a method of preparing multilayer carbon nanotube array/polymer composite films. The method includes the following steps:

(1). A first carbon nanotube-based film prepared, for example, in the first embodiment or carbon nanotube array prepared in the second embodiment is placed at a bottom portion of a container, and then the pre-polymer solution prepared, e.g., as in the first or second embodiment, is poured in the container.

(2). After the pre-polymer solution is poured in the container, the container is advantageously able to stand for 0.5~2 hours (one hour is quite suitable) so that the pre-polymer solution can adequately settle and fill in interspaces of the first carbon nanotube-based film or carbon nanotube array to thereby form a mixed layer of the first carbon nanotube-based film or carbon nanotube array and pre-polymer solution at the bottom portion of the container.

(3). The pre-polymer solution is polymerized, and the pre-polymer solution is simultaneously integrated with the first carbon nanotube-based film or carbon nanotubes array, thereby obtaining a carbon nanotubes/polymer composite material.

The processes of polymerization and integration are described in detail as follows. Firstly, the container that contains the pre-polymer solution and the first carbon nanotube-based film or the carbon nanotubes array therein, is held at a temperature of 50° C.~60° C. for 2 hours to urge the pre-polymer solution to polymerize, and to simultaneously integrate with the first carbon nanotube-based film or carbon nanotube array. The container is further heated to 90° C.~100° C. for approximate 2 hours, so that the pre-polymer solution continues to polymerize and integrate with the first carbon nanotube-based film or carbon nanotube array, thereby forming a first layer of carbon nanotube-based film or carbon nanotube array/polymer composite film.

(4). One or more additional layers can be formed on the composite. To do so, an additional (e.g., in this case, the second) layer of the carbon nanotube-based film or carbon nanotube array is disposed on the exposed/upper (e.g., in the case, the first) layer of carbon nanotube/polymer composite film, and then a definite amount/volume of the pre-polymer solution is poured in the container. After a while, using a treatment process like that used for the first layer, the pre-polymer solution is polymerized and integrated with the additional (e.g., second) carbon nanotube-based film or carbon nanotube array, thereby forming the next additional (e.g., second) layer of carbon nanotube/polymer composite film.

Repeating the step (4), a multilayer carbon nanotube/polymer composite film of a desired number of composite layers can be easily prepared.

Figure 8:
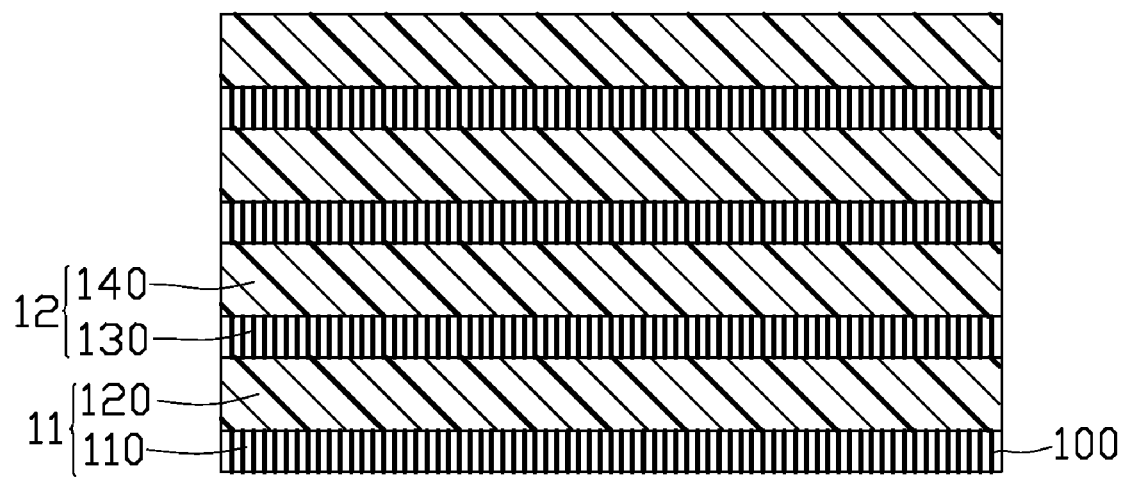
FIG. 8 is a cutaway view of multilayer carbon nanotubes array/polymer composite films, according to a third present embodiment.

Referring to FIG. 8, a cutaway view of multilayer carbon nanotube array/polymer composite 10 is shown. The first layer 11 of carbon nanotubes array/polymer composite 10 includes a layer of a carbon nanotube array/polymer composite film 110 and a layer of polymer 120. The layer of the carbon nanotube array/polymer composite film 110 includes a plurality of carbon nanotubes 100. It can be seen from FIG. 8 that the carbon nanotubes 100 are regularly arranged. The second layer 12 of a carbon nanotubes array/polymer composite film is the same to the first layer 11 of carbon nanotubes array/polymer composite film 11 and also includes a layer of carbon nanotube array/polymer composite film 130 and a layer of polymer 140.

Figure 9:
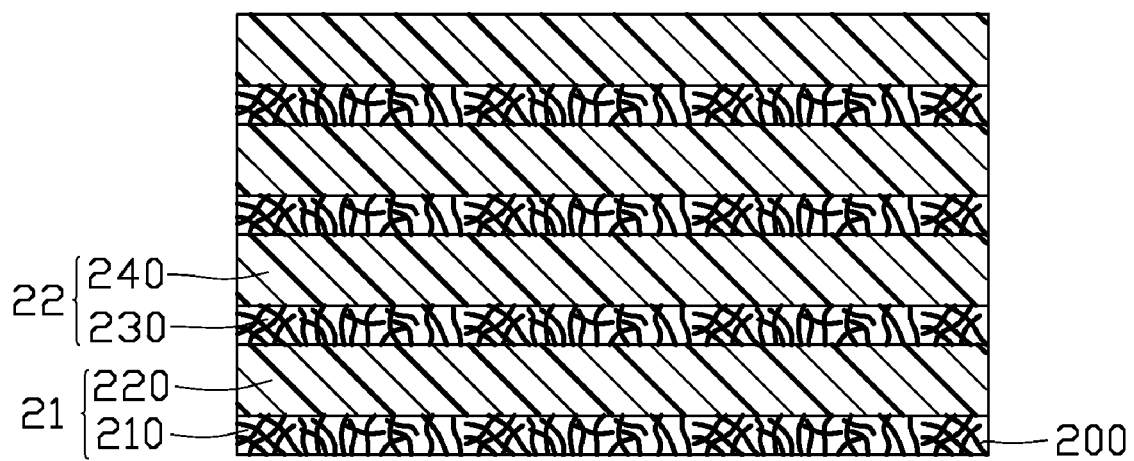
FIG. 9 is a cutaway view of multilayer carbon nanotube-based film/polymer composite films, according to another variant of the third present embodiment.

Referring to FIG. 9, a cutaway view of a multilayer carbon nanotube-based film/polymer composite 20 is shown. The first layer of carbon nanotube-based film/polymer composite film 21 includes a layer of carbon nanotube-based film/polymer composite film 210 and a layer of polymer 220. The layer of carbon nanotube array/polymer composite film 210 includes a plurality of carbon nanotubes 200. It can be seen from FIG. 9 that carbon nanotubes 200 are irregularly arranged. The second layer of carbon nanotube-based film/ polymer composite film 22 is the same to the first layer of carbon nanotube-based film/polymer composite film 21 and also includes a layer of carbon nanotube-based film/polymer composite film 230 and a layer of polymer 240.

The carbon nanotube/polymer composite material prepared according to the embodiments has good electrical conductivity and thermal conduction. The electrical conductivity of the carbon nanotube/polymer composite material is improved by a factor of two (2) over that of a carbon nanotube/polymer composite material prepared by a conventional method. In particular, the electrical conductivity can reach 120 siemens/meter. In addition, the interspaces between the carbon nanotubes are filled with polymer to obtain a stable mechanical connection of the carbon nanotubes. Furthermore, the layer of carbon nanotubes stably connects with the layer of polymer via that same interspace-filling polymer. Therefore, the carbon nanotube/polymer composite material has generally good mechanical properties.

Carbon nanotubes have a stable connection with PMMA in the carbon nanotubes/PMMA composite film prepared according to the first embodiment and in the carbon nanotubes array/PMMA composite film prepared according to the second embodiment. Both the carbon nanotubes/PMMA composite film and the carbon nanotubes array/PMMA composite film can be used as an antistatic material or thermal interface material, due to the good electrical conductivity and thermal conduction of the carbon nanotubes.

The process of preparing multilayer carbon nanotube/polymer composite according to the third embodiment is comparatively simple. It is easy to create an insulative barrier between the two adjacent layers of carbon nanotube/polymer composite films, by using a desired excess amount of pre-polymer material. The multilayer carbon nanotubes/composite can be used, for example, as a capacitor or an electromagnetic shielding material, due to the good electrical conductivity and thermal conduction of the carbon nanotubes.

While certain embodiment has been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method of preparing a carbon nanotube/polymer composite material, comprising the steps of:
    providing a carbon nanotube-based film and a pre-polymer solution;
    placing the carbon nanotube-based film in a container, and pouring the pre-polymer solution in the container to cover the carbon nanotube-based film; and
    keeping the carbon nanotube-based film in the container and polymerizing the pre-polymer solution in the container into a polymer.

2. The method as claimed in claim 1, wherein a method of preparing the carbon nanotube-based film comprises the steps of:
    mixing carbon nanotubes and dimethyl formamide solution together;
    dispersing the carbon nanotubes into the dimethyl formamide solution by an ultrasonic vibration dispersion method, thereby obtaining a mixture; and
    volatilizing the dimethyl formamide from the mixture, thereby forming the carbon nanotube-based film.

3. The method as claimed in claim 2, wherein the carbon nanotubes are ultrasonically dispersed into the dimethyl formamide solution for 0.5 to 4 hours.

4. The method as claimed in claim 1, wherein the carbon nanotube-based film is a carbon nanotube array.

5. The method as claimed in claim 1, wherein the carbon nanotube-based film is produced by a chemical vapor deposition method.

6. The method as claimed in claim 1, wherein a method of preparing the pre-polymer solution comprises the steps of:
mixing 93 to 99.98 wt % of a polymer, 0.02 to 2 wt % of reaction initiator, and 0 to 5 wt % of an assistant together;
pre-polymerizing the mixture at a temperature of 80° C. to 95° C. with stirring for 5 to 30 minutes; and
cooling the mixture until the pre-polymerization reaction is stopped.

7. The method as claimed in claim 6, wherein the mixture is naturally cooled in an air atmosphere until pre-polymerization reaction is stopped.

8. The method as claimed in claim 6, wherein the pre-polymer is selected from the group consisting of ethyl acrylate, butyl acrylate, styrene, butadiene, acrylonitrile, and combinations thereof; the reaction initiator is selected from the group consisting of benzoperoxide, azodiisobutyronitrile, and combinations thereof; the assistant is selected from the group consisting of dibutyl phthalate, cetyl trimethyl ammoniumbromide, polyethylene acid salt, polymethacrylic acid salt, $C_{12}$-$C_{18}$ high fatty acid, silane coupling agent, titanate coupling agent, aluminate coupling agent, and combinations thereof.

9. The method as claimed in claim 1, wherein after the pre-polymer solution is poured in the container, the container is allowed to settle for 0.5 to 2 hours so that the pre-polymer solution adequately fills in any interspaces of the carbon nanotube-based film to thereby form a mixed layer of the carbon nanotube-based film and pre-polymer solution.

10. The method as claimed in claim 1, wherein the processes of polymerization and integration comprise the steps of:
holding the container with the pre-polymer solution and the carbon nanotube-based film therein at a temperature of 50° C. to 60° C. for 1 to 4 hours in order to urge the pre-polymer solution to polymerize and to integrate with the carbon nanotube-based film; and
heating the container to 90° C. to 100° C. for 2 hours to thereby urge the pre-polymer solution to further polymerize and integrate with the carbon nanotube-based film.

11. The method as claimed in claim 1, wherein the carbon nanotube-based film integrates with the pre-polymer solution at the interface therebetween.

12. A method of preparing a multilayer carbon nanotube/polymer composite material, comprising the steps of:
(a) providing a first carbon nanotube-based film and a pre-polymer solution;
(b) placing the first carbon nanotube-based film in a container, and pouring the pre-polymer solution in the container to cover the carbon nanotube-based film, a depth of the pre-polymer solution being greater than a thickness of the first carbon nanotube-based film; and
(c) keeping the carbon nanotube-based film in the container and polymerizing the pre-polymer solution in the container into a polymer, thereby yielding a first layer of carbon nanotube/polymer composite film and an upper polymer layer thereon;
(d) disposing a second carbon nanotube-based film on the upper polymer layer, pouring the pre-polymer solution in the container, a depth of the pre-polymer solution being greater than a thickness of the second carbon nanotube-based film, urging the pre-polymer solution to polymerize into a polymer, thereby forming a second layer of carbon nanotube/polymer composite film and a new upper polymer layer thereon; and
(e) repeating the step (d) a predetermined number of times to thereby prepare a multilayer carbon nanotube/polymer composite material.

13. The method as claimed in claim 12, wherein after the pre-polymer solution is poured in the container, the container is permitted to settle for 0.5 to 2 hours so that the pre-polymer solution adequately fills in any interspaces of the first carbon nanotube-based film to thereby form a mixed layer of carbon nanotube-based film and pre-polymer solution.

14. The method as claimed in claim 12, wherein the processes of polymerization and integration comprising the steps of:
holding the container with the pre-polymer solution and the first carbon nanotube-based film therein at a temperature of 50° C. to 60° C. for 1 to 4 hours in order to urge the pre-polymer solution to polymerize and to integrate with the first carbon nanotube-based film; and
heating the container to 90° C. to 100° C. for 2 hours to thereby urge the pre-polymer solution to further polymerize and to integrate with the first carbon nanotube-based film.

15. The method as claimed in claim 12, wherein two adjacent carbon nanotube/polymer composite films are insulated by one upper polymer layer.

16. A method of preparing a carbon nanotube/polymer composite material, comprising the steps of:
providing a carbon nanotube-based film and a pre-polymer solution, the carbon nanotube-based film consisting of a plurality of carbon nanotubes;
placing the carbon nanotube-based film in a container, and pouring the pre-polymer solution in the container to integrate with the carbon nanotube-based film, a depth of the pre-polymer solution being greater than a thickness of the first carbon nanotube-based film, the carbon nanotube-based film thereby being covered by the pre-polymer solution;
keeping the carbon nanotube-based film in the container and urging the pre-polymer in the pre-polymer solution in the container to polymerize into a polymer, thereby forming a carbon nanotube/polymer composite film and an upper polymer layer thereon.

17. The method as claimed in claim 16, wherein the upper polymer layer is insulating.

18. The method as claimed in claim 16, wherein the carbon nanotube/polymer composite film is conductive.

19. The method as claimed in claim 16, wherein the pre-polymer is selected from the group consisting of ethyl acrylate, butyl acrylate, styrene, butadiene, acrylonitrile, and combinations thereof.

20. The method as claimed in claim 1, wherein the carbon nanotube film comprises a first surface and a second surface opposite to the first surface, only the first surface of the carbon nanotube film other than the second surface is covered by the pre-polymer solution.

* * * * *